United States Patent [19]

Jones

[11] Patent Number: 5,006,965
[45] Date of Patent: Apr. 9, 1991

[54] DIMMER FOR FIBER OPTIC LIGHT TRANSMISSION SYSTEMS

[75] Inventor: Eric M. Jones, Los Angeles, Calif.

[73] Assignee: Karl Storz Endoscopy-America, Inc., Culver City, Calif.

[21] Appl. No.: 491,562

[22] Filed: Mar. 9, 1990

[51] Int. Cl.$^5$ .............................................. F21V 7/04
[52] U.S. Cl. .................................... 362/32; 362/277; 362/293; 362/307; 362/319; 362/321; 362/322
[58] Field of Search ................. 362/32, 276, 277, 280, 362/282, 293, 294, 307, 319, 320, 321, 322, 263; 350/96.18, 96.19, 206, 207, 208, 96.15, 96.20

[56] References Cited

U.S. PATENT DOCUMENTS 4,233,650  11/1980  Hagner et al. ......................... 362/32
4,425,599  1/1984   Rieder et al. ......................... 362/277
4,860,172  8/1989   Schlager ............................... 362/32

FOREIGN PATENT DOCUMENTS 80217  4/1988  Japan ..................................... 362/32

Primary Examiner—James C. Yeung
Attorney, Agent, or Firm—Donald D. Mon

[57] ABSTRACT

A dimmer for adjustably attenuating light to a fiber optic bundle. An opaque vane has a movement axis with a band on each side. One band has a substantially opaque portion which blocks about 50% of the light of a spot directed against the vane, and an opaque portion for passing about 50%. The other band has transmission slots interspaced between opaque bars, proportioned and arranged to pass varying amounts of light, all as a function of the position of the vane. The light passed by the bands is additive.

3 Claims, 2 Drawing Sheets

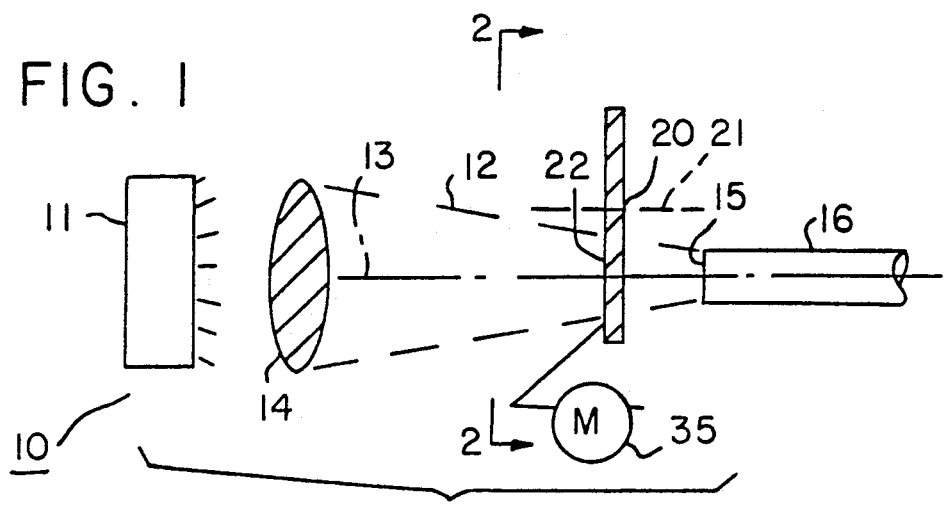
FIG. 1
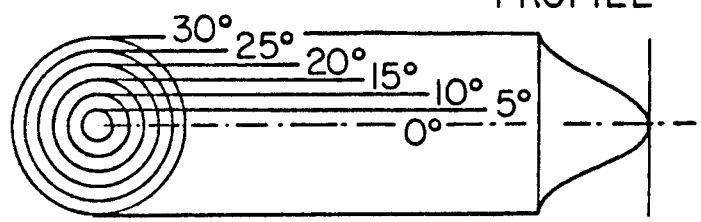
AXIAL VIEW INTO LAMP | OUTPUT BEAM PROFILE
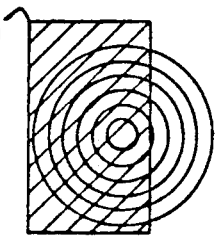 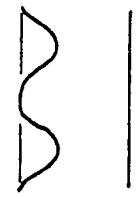
FIG. 3(a)
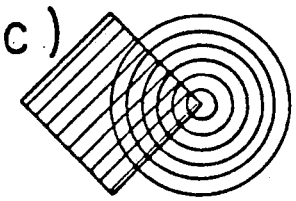 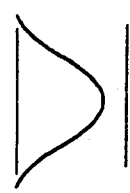
FIG. 3(b)
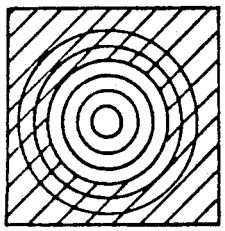 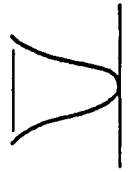
FIG. 3(c)
FIG. 3(d)
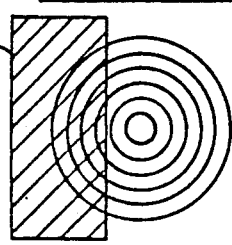 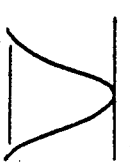
FIG. 3(e)

DIMMER FOR FIBER OPTIC LIGHT TRANSMISSION SYSTEMS

FIELD OF THE INVENTION

This invention relates to adjustment of light intensity provided to a fiber optic light transmission system.

BACKGROUND OF THE INVENTION

Illumination systems, especially those utilized in endoscopic surgery, use a very high intensity lamp whose intensity cannot itself effectively be varied. Instead it is operated at full power, and means downstream from it are provided to reduce the quantum of light transmitted to the illuminated site. This avoids such complications as color change of the generated light which could be caused by operating the lamp at a lesser intensity, and some type of useful lamps simply cannot be operated successfully at a lesser intensity.

The reduction of transmitted light by lens systems using such expedients as irises is well-known and appropriate to other systems. However, such devices are not appropriate to fiber optic systems. This is because of the unique properties of fiber optic transmission.

A fiber receives a converging beam of light, and emits a beam rotationally faithful to its source. Accordingly, conventional masking devices tend to produce illuminating patterns whose brightness varies significantly across it. In some fields of work, this is tolerable. However, in the field of endoscopic surgery, for example, a small movement of the instrument could result in critical surgical area being too dark, or perhaps not illuminated at all.

This is not a neW problem, and there have been numerous efforts to provide a mechanical dimmer which will produce more even illumination across the illuminated field. Perhaps the most advanced such device known to the inventor herein is shown in Volpi U.S. Pat. No. 4,425,599. However, this and other previously known blocking means for dimming produce dimmer or dark sections, a phenomenon know as "ringing".

It is an object of this invention to provide a vane for dimming light which greatly reduces, even nearly eliminating, ringing, and having a substantial dynamic range of adjustment of light throughput, in this invention as great as 20:1.

It is another object of this invention to provide a vane which in various patterns of dimming, can provide effects ranging from exponential attenuation to other mathematical relationships, such as linear.

It is another object of this invention to provide a dimmer in which the mechanism is rugged and simple, and once installed needs no care or attention other than keep it clean.

BRIEF DESCRIPTION OF THE INVENTION

A dimmer according to this invention includes a vane placed in the optical path of a focused light beam from a constant-intensity light source. The beam forms an illuminated spot on the vane. The vane is made of opaque material, and is shaped and slotted to permit passage of light according to the relative position of the vane and the spot.

The vane may be linearly movable, but preferably will be rotatable, and is disposed in the light beam, normal to the optical axis of the beam. The vane has a control area extending along an axis of relative movement relative to the spot. The control area has a first band extending along one side of the axis of movement, and a second band extending along the other side.

The first one of the bands has a substantial imperforate length, thereby reducing by one half the area of the light beam passed by the vane. The remainder of its length is open.

The second one of the bands includes transmissive slots disposed between opaque bands, whose width and relative locations are such as to vary the amount of light transmitted by this band. Along the imperforate portion of the first band, all of the transmitted light passes through the slot. Along the open portion of the first band, the light transmitted is additive to that which passes through the first band.

This arrangement enables practical and selectable patterns of slots to be produced, by requiring dimming only of nearly 50% of the total light beam, the remainder being either totally blocked, or additive to an attenuated portion of the beam.

The above and other features of this invention will be fully understood from the following detailed description and the accompanying drawings, in which:

BRIEF DESCRIPTION OF THE DRAWINGS

FIG. 1 is an axial cross-section of the presently-preferred embodiment of the invention;

FIG. 3 shows comparisons of light patterns produced by various dimming schemes.

DETAILED DESCRIPTION OF THE INVENTION

Figure 2:
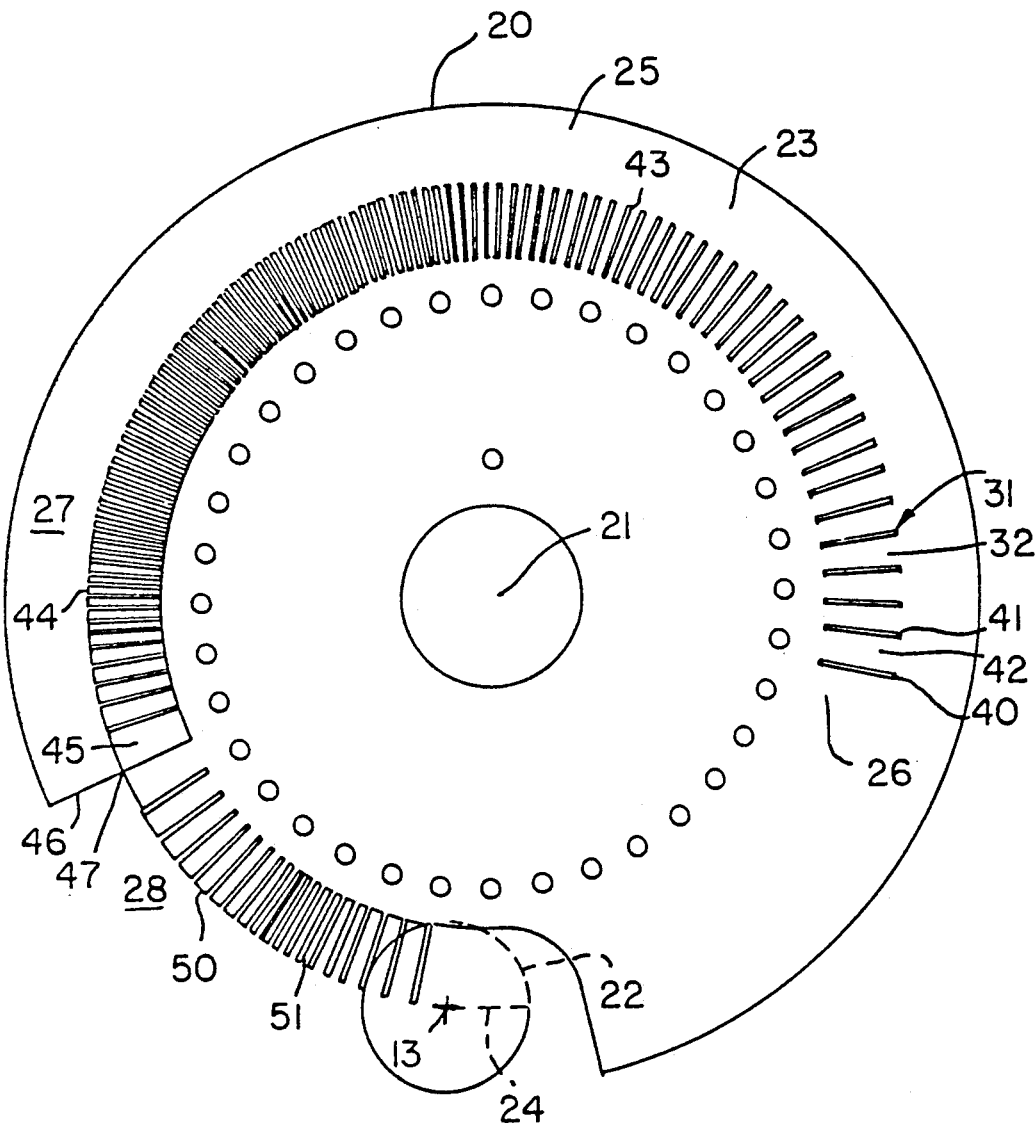
FIG. 2 is a plan view of a vane taken at line 2—2 in FIG. 1.

An optical system 10 according to this invention is shown in FIG. 1. It includes a light source 11. Commonly this light source will be a high intensity Xenon bulb which is intended to be operated at its full output. Dimming of its light is accomplished by downstream blockage or diversion.

The light source produces a light beam 12 with an optical axis 13. A condenser lens 14 focuses the beam toward the input end 15 of a fiber optic bundle 16. The bundle is intended to transmit light to its other end, from which it emits to illuminate a region under investigation.

A vane 20 is placed in the path of the beam. It is an opaque body, preferably of a heat-resistive metal, normal to optical axis 13. It has an axis of rotation 21 parallel to axis 13, and offset from it.

The beam forms a "spot" 22 on the vane, spaced from the axis 21 of the vane. An arcuate control area 23 extends circumferentially around the vane. It has a movement axis 24 that coincides with the center of the beam. Movement axis 24 divides the control area into a first band 25, which lies on one side of this axis, and a second band 26, which lies on the other side.

Outer first band 25 has a substantial arcuate imperforate portion 27 which is imperforate. The remainder of its active length is an open portion 28. Thus it will be seen that when area 27 is in the path of the beam, 50% of the light beam is stopped by the vane. When area 28 is in the path of the beam, then this 50% is restored to the transmitted portion of the beam.

Thus, the outer band reduces the amount of fine control required to be accomplished by the vane. Inner second band 26 must attenuate only half of the light. It is arranged such as to transmit portions of the beam.

The transmission of lesser intensities is entirely through the second band, because the first band blocks half of the light. Above the 50% level, the light transmitted by the second band is added to the light transmitted by the first band.

The second band includes a progression of slots 31 interspersed with opaque bars 32. The widths of the slots and bars are selected so as to produce a desired light transmission. FIG. 2 is a scale drawing of one suitable arrangement, which produces an output which, while not a straight line function of rotation, is close enough to provide a smooth variation of intensity to a surgeon. What is to be avoided are abrupt changes. Gradual changes, producing a sensibly uniform illumination pattern, is the objective that is met by this device. If desired, a motor 35 can be provided to rotate the vane, under control of the surgeon.

By the way of further explanation, attention is called to slots 40 and 41. These are relatively far apart, spaced by a wide bar 42. The bars narrow as they approach slot 48, but the slots remain about the same width. After this region, the bars remain about constant, but slots such as slot 44 become wider. Finally, slot 45 is quite wide, and abuts edge 46 of the first band. This creates a "cross-over" point 47, where light becomes controlled along with light passed by the outer band. Then bars 50 start to decrease while the slots are constant, followed by a region near slot 51 where the slots again increase in width.

It is evident that as the vane turns, the light transmitted by the inner band increases while the outer band blocks transmission. Then at the cross-over point, the inner band again has reduced throughput, which gradually increases. This time in addition to the light transmitted by the outer band.

It is a preferred feature of this invention that the slots are formed such that when they are aligned with the optical axis, they meet or nearly meet the optical axis, and then that they are on a radius of the spot. Of course they do not always remain radial, while the vane turns but this arrangement does result in minimal ringing of the output from the fiber optic bundle.

The illustrated arrangement and sizes of the slots and bars are for purposes of providing an example. Many other patterns of slots, bars, and portions of the first band can be provided, which will produce a desired, but different dimming pattern. If an exponential, rather than a straight line change is desired, then the change in attenuation for any given amount of rotation of the vane will be the same all the way along the movement axis. This can be advantageous if a constant light output must be provided under control of a feedback line, such as to a video camera.

The vane may be linear instead of rotational. In such event, the control area would be linear and moved back and forth across the optical axis. The axes in the rotational vane will be curved. In linear devices they will be straight. Both are within the scope of the invention.

Also, instead of being transmissive, this can be a reflective device, the blocking portions merely being non-reflective. This is not as practical an arrangement as that which is illustrated, but is within the scope of the invention. The slots would merely be replaced by reflective regions.

FIG. 3a–3e show the results of various other dimming schemes. FIG. 3a shows the normal profile of a lamp. FIG. 3b shows the result of blocking with a screen 60 which crosses the center. Note the dark center area.

FIG. 3c shows blockage of a sector. While the output beam is acceptable, the mechanism exerts an upper limit on the transmission, defined by the minimum size of the sector.

FIG. 3d shows an iris type blockage. Notice the center peaks and dark outer edges.

FIG. 3e shows the use of a screen which occludes part of the beam, extending across a chord 61. Again notice the sharp center intensity and the dark outer ring.

In contrast, this invention produces an output beam of sensibly constant intensity across it, without a bright center or dark outer ring. In addition there is no lower limit for dimming or upper limit on transmission, because the blockage can be entire or zero, and all settings between. The mechanism does not create a limitation such as in FIG. 3c.

This invention thereby provides a convenient mechanical dimmer which produces a smooth attenuation, and an output substantially devoid of rings or a dark center.

This invention is not to be limited by the embodiments shown in the drawings and described in the description, which are given by way of example and not of limitation, but only in accordance with the scope of the appended claims.

I claim:

1. A dimmer to attenuate the light provided to an input end of a fiber optic bundle, said driver attenuating light in a focused beam from a constant-intensity light source, said beam having an optical axis, said dimmer comprising:

an opaque vane with a control area disposed in said beam, normal to said optical axis, so disposed and arranged that the beam focuses a spot on said control area, said control area having a movement axis always coincident with said optical axis, said control area having a first band on one side of the movement axis, and a second band on the other side thereof, said first band having a substantial imperforate portion extending along said movement axis, whereby to block substantially 50% of the light in the spot, and an open portion extending along said movement axis for passing said 50% of the light, blockage or transmission being a function of the location of said first band relative to said spot, said second band, along portions adjacent to said imperforate portion of said first band, having slots extending therethrough, interspersed with opaque bars, the width and spacing of said slots and bars being such as to provide increasing transmission of light through said second band when the vane is moved so as to move the control area relative to the spot, toward the open portion of the first band, until adjacent to the location where the imperforate and open portions of the first band join one another, the second band transmits substantially 50% of the light of the beam, and along the portion of the second band adjacent to the open portion of the first band, the second band has slots interspersed with bands, whose width and spacing successively change such that with additional movement of the vane, the light transmitted by the second band gradually increases, being additive to the light transmitted by the open portion of the first band.

2. Apparatus according to claim 1 in which said slots are so disposed and arranged that when aligned with said optimal axis, they intersect it, and extend normally away from it.

3. Apparatus according to claim 2 in which said vane is a rotatable disc, in which said slots extend radially from it, and in which said movement axis and bands are circumferential.

* * * * *